United States Patent
Dadheech et al.

(10) Patent No.: US 10,673,046 B2
(45) Date of Patent: Jun. 2, 2020

(54) SEPARATOR FOR LITHIUM METAL BASED BATTERIES

(71) Applicant: GM GLOBAL TECHNOLOGY OPERATIONS LLC, Detroit, MI (US)

(72) Inventors: Gayatri V. Dadheech, Bloomfield Hills, MI (US); Li Yang, Troy, MI (US); Mei Cai, Bloomfield Hills, MI (US); Biqiong Wang, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 124 days.

(21) Appl. No.: 15/953,142

(22) Filed: Apr. 13, 2018

(65) Prior Publication Data
US 2019/0319242 A1 Oct. 17, 2019

(51) Int. Cl.
*H01M 2/14* (2006.01)
*H01M 2/16* (2006.01)
*H01M 10/0525* (2010.01)

(52) U.S. Cl.
CPC ......... *H01M 2/1686* (2013.01); *H01M 2/166* (2013.01); *H01M 10/0525* (2013.01)

(58) Field of Classification Search
CPC . H01M 2/1686; H01M 2/166; H01M 10/0525
See application file for complete search history.

(56) References Cited

U.S. PATENT DOCUMENTS

| | | |
|---|---|---|
| 8,974,946 B2 | 3/2015 | Cai et al. |
| 9,160,036 B2 | 10/2015 | Yang et al. |
| 9,252,411 B2 | 2/2016 | Abd Elhamid et al. |
| 9,373,829 B2 | 6/2016 | Xiao et al. |
| 9,647,254 B2 | 5/2017 | Dadheech et al. |

(Continued)

FOREIGN PATENT DOCUMENTS

| | | | |
|---|---|---|---|
| CN | 106159159 A | * | 11/2016 |
| CN | 109411811 A | | 3/2019 |

(Continued)

OTHER PUBLICATIONS

Li Yang et al.; U.S. Appl. No. 15/295,600, filed Oct. 17, 2016 entitled "Three-Electrode Test Cell"; 33 pages.

(Continued)

*Primary Examiner* — Jane J Rhee
(74) *Attorney, Agent, or Firm* — Harness, Dickey & Pierce, P.L.C.

(57) ABSTRACT

A modified separator for a high-energy lithium metal-based electrochemical cell and methods of formation relating thereto are provided. The modified separator includes a substrate including a dopant and a coating layer disposed on the doped substrate. The dopant and compound comprising the coating layer are independently selected from the group consisting of: aluminum oxide ($Al_2O_3$), titanium dioxide ($TiO_2$), zirconium dioxide ($ZrO_2$), zinc oxide (ZnO), iron oxide ($Fe_2O_3$), tin oxide (SnO), silicon oxide ($SiO_2$), tantalum oxide ($Ta_2O_5$), lanthanum oxide ($La_2O_3$), hydrofluoroolefin (HfO), cerium oxide ($CeO_2$), and combinations thereof.

20 Claims, 3 Drawing Sheets

(56) References Cited

U.S. PATENT DOCUMENTS

| | | | |
|---|---|---|---|
| 9,742,028 | B2 | 8/2017 | Zhou et al. |
| 2008/0268327 | A1 | 10/2008 | Gordon et al. |
| 2009/0136830 | A1 | 5/2009 | Gordon |
| 2012/0251869 | A1 | 10/2012 | Lee et al. |
| 2014/0170465 | A1* | 6/2014 | Visco ............. H01G 11/06 429/144 |
| 2015/0056387 | A1 | 2/2015 | Dadheech et al. |
| 2015/0056493 | A1 | 2/2015 | Dadheech et al. |
| 2015/0236324 | A1 | 8/2015 | Xiao et al. |
| 2015/0349307 | A1 | 12/2015 | Dadheech et al. |
| 2016/0020491 | A1 | 1/2016 | Dai et al. |
| 2016/0064770 | A1 | 3/2016 | Lee et al. |
| 2016/0141598 | A1 | 5/2016 | Dai et al. |
| 2016/0172665 | A1 | 6/2016 | Zhou et al. |
| 2016/0172681 | A1 | 6/2016 | Yang et al. |
| 2016/0172706 | A1 | 6/2016 | Xiao et al. |
| 2016/0172710 | A1 | 6/2016 | Liu et al. |
| 2016/0181658 | A1 | 6/2016 | Kim et al. |
| 2016/0218342 | A1 | 7/2016 | Xiao et al. |
| 2016/0254567 | A1 | 9/2016 | Cai et al. |
| 2017/0162859 | A1 | 6/2017 | Yang et al. |
| 2017/0214079 | A1 | 7/2017 | Dai et al. |
| 2017/0222210 | A1 | 8/2017 | Xiao |
| 2017/0271678 | A1 | 9/2017 | Yang et al. |
| 2017/0288230 | A1 | 10/2017 | Yang et al. |
| 2017/0288281 | A1 | 10/2017 | Chiang et al. |
| 2017/0338490 | A1 | 11/2017 | Xiao et al. |
| 2018/0048022 | A1 | 2/2018 | Yang et al. |
| 2018/0062206 | A1 | 3/2018 | Yang et al. |
| 2018/0108952 | A1 | 4/2018 | Yang et al. |
| 2018/0309165 | A1 | 10/2018 | Yersak et al. |
| 2018/0309166 | A1 | 10/2018 | Yersak et al. |
| 2018/0375148 | A1 | 12/2018 | Yersak et al. |
| 2019/0044134 | A1 | 2/2019 | Liu et al. |
| 2019/0058210 | A1 | 2/2019 | Dai et al. |
| 2019/0058211 | A1 | 2/2019 | Yang et al. |
| 2019/0067675 | A1 | 2/2019 | Xiao |
| 2019/0067744 | A1 | 2/2019 | Xiao et al. |
| 2019/0089006 | A1 | 3/2019 | Yang et al. |

FOREIGN PATENT DOCUMENTS

| | | |
|---|---|---|
| CN | 110379984 A | 10/2019 |
| DE | 102018119757 A1 | 2/2019 |
| DE | 102019109226 A1 | 10/2019 |

OTHER PUBLICATIONS

Fang Liu et al.; U.S. Appl. No. 15/666,170, filed Aug. 1, 2017 entitled "Conformal Coating of Lithium Anode via Vapor Deposition for Rechargeable Lithium Ion Batteries"; 52 pages.

Li Yang et al.; U.S. Appl. No. 15/677,249, filed Aug. 15, 2017 entitled "Ether-Based Electrolyte System Improving or Supporting Anodic Stability of Electrochemical Cells Having Lithium-Containing Anodes"; 44 pages.

Fang Dai et al.; U.S. Appl. No. 15/677,760, filed Aug. 15, 2017 entitled "Lithium Metal Battery With Hybrid Electrolyte System"; 48 pages.

Xingcheng Xiao; U.S. Appl. No. 15/692,107, filed Aug. 31, 2017 entitled "Methods of Applying Self-Forming Artificial Solid Electrolyte Interface (SEI) Layer to Stabilize Cycle Stability of Electrodes in Lithium Batteries"; 45 pages.

Li Yang et al.; U.S. Appl. No. 15/710,326, filed Sep. 20, 2017 entitled "Hybrid Metal-Organic Framework Separators for Electrochemical Cells"; 46 pages.

H. Zhou, Y. Wang, H. Li, and P. He, "The development of a new type of rechargeable batteries based on hybrid electrolytes," ChemSusChem, vol. 3, No. 9, pp. 1009-1019, 2010.

J. Christensen, P. Albertus, R. S. Sanchez-Carrera, T. Lohmann, B. Kozinsky, R. Liedtke, J. Ahmed, and A. Kojic, "A Critical Review of Li/Air Batteries," J. Electrochem. Soc., vol. 159, No. 2, p. R1, 2012.

L. Wang, Y. Wang, and Y. Xia, "A high performance lithium-ion sulfur battery based on a $Li_2S$ cathode using a dual-phase electrolyte," Energy Environ. Sci., vol. 8, No. 5, pp. 1551-1558, 2015.

Q. Wang, Z. Wen, J. Jin, J. Guo, X. Huang, J. Yang, and C. Chen, "A gel-ceramic multi-layer electrolyte for long-life lithium sulfur batteries," Chem. Commun., vol. 52, No. 8, pp. 1637-1640, 2016.

W. Zhou, S. Wang, Y. Li, S. Xin, A. Manthiram, and J. B. Goodenough, "Plating a Dendrite-Free Lithium Anode with a Polymer/ Ceramic/ Polymer Sandwich Electrolyte," J. Am. Chem. Soc., vol. 138, pp. 9385-9388, 2016.

X. Yu, Z. Bi, F. Zhao, and A. Manthiram, "Hybrid Lithium—Sulfur Batteries with a Solid Electrolyte Membrane and Lithium Polysulfide Catholyte," ACS Appl. Mater. Interfaces, vol. 7, pp. 16625-16631, 2015.

X. Yu, Z. Bi, F. Zhao, and A. Manthiram, "Polysulfide-Shuttle Control in Lithium-Sulfur Batteries with a Chemically / Electrochemically Compatible NaSICON-Type Solid Electrolyte," Adv. Energy Mater., p. 1601392, 2016.

Y. Li, B. Xu, H. Xu, H. Duan, X. Lü, S. Xin, W. Zhou, L. Xue, G. Fu, and A. Manthiram, "Hybrid Polymer/Garnet Electrolyte with a Small Interfacial Resistance for Lithium-Ion Batteries," Angew. Chemie, vol. 129, No. 3, pp. 771-774, 2017.

Y. Wang and H. Zhou, "A lithium-air battery with a potential to continuously reduce $O_2$ from air for delivering energy," J. Power Sources, vol. 195, No. 1, pp. 358-361, 2010.

Yang Zhao et al., "Robust Metallic Lithium Anode Protected by Molecular Layer Deposition Technique"; *Small Methods*, 2018, DOI: 10.1002/smtd.201700417.

\* cited by examiner

SEPARATOR FOR LITHIUM METAL BASED BATTERIES

INTRODUCTION

This section provides background information related to the present disclosure which is not necessarily prior art.

The present disclosure relates to lithium metal-based electrochemical cells comprising doped and coated separators and high viscosity based electrolytes, and formation methods relating thereto.

By way of background, high-energy density, electrochemical cells, such as lithium-ion batteries can be used in a variety of consumer products and vehicles, such as Hybrid Electric Vehicles (HEVs) and Electric Vehicles (EVs). Typical lithium-ion and lithium-sulfur batteries include a first electrode, a second electrode, an electrolyte material, and a separator. One electrode serves as a positive electrode or cathode (on discharge) and another serves as a negative electrode or anode (on discharge). A stack of battery cells may be electrically connected to increase overall output. Conventional rechargeable lithium-ion batteries operate by reversibly passing lithium-ions back and forth between the negative electrode and the positive electrode. A separator and an electrolyte are disposed between the negative and positive electrodes. The electrolyte is suitable for conducting lithium-ions and may be in solid (e.g., solid state diffusion) or liquid form. Lithium-ions move from a cathode (positive electrode) to an anode (negative electrode) during charging of the battery, and in the opposite direction when discharging the battery.

Many different materials may be used to create components for a lithium-ion battery. Common negative electrode materials include lithium insertion materials or alloy host materials, like carbon-based materials, such as lithium-graphite intercalation compounds, or lithium-silicon compounds, lithium-tin alloys, and lithium titanate (LTO) (e.g., $Li_{4+x}Ti_5O_{12}$, where $0 \leq x \leq 3$, such as $Li_4Ti_5O_{12}$). The negative electrode may also be made of metallic lithium (often referred to as a lithium metal anode (LMA)), so that the electrochemical cell is considered a lithium metal battery or cell. Use of metallic lithium in the negative electrode of a rechargeable battery has various potential advantages, including having the highest theoretical capacity and lowest electrochemical potential. Thus, batteries incorporating lithium metal anodes can have a higher energy density potentially doubling storage capacity and halving the size of the battery, while maintaining a similar cycle life as other lithium ion batteries. Lithium metal batteries are thus one of the most promising candidates for high energy storage systems.

However, lithium metal batteries also have potential downsides in some instances. For example, the comparatively high level of reactivity of the lithium metal may result in interfacial instability and undesired side reactions. Side reactions may occur between the lithium metal and various species the lithium metal may be exposed to during manufacture and/or operation of the electrochemical cell. Such side reactions may promote unfavorable dendrite formation. Further, in certain aspects, separators based on polyolefins, and as may be included in lithium metal batteries, generally show low wettability towards electrolytes. In such instances, the electrolyte may not permeate the separator or completely fill the pores of the porous separator, resulting in reduced performance and cycle life of the lithium metal battery. Accordingly, it would be desirable to develop reliable, high-performance materials, such as separators having comparatively high wettability, for use in high energy electrochemical cells, and methods relating thereto, that minimize or prevent dendrite formation.

SUMMARY

This section provides a general summary of the disclosure, and is not a comprehensive disclosure of its full scope or all of its features.

In various aspects, the present disclosure provides a modified separator for an electrochemical cell that cycles lithium ions. The modified separator may include a polymeric separator and an electrolyte system having a viscosity ranging from about 50 mPa·s to about 500 mPa·s. The polymeric separator may comprise a doped substrate and a coating layer disposed thereon. The substrate may be doped with a dopant selected from the group consisting of: aluminum oxide ($Al_2O_3$), titanium dioxide ($TiO_2$), zirconium dioxide ($ZrO_2$), zinc oxide (ZnO), iron oxide ($Fe_2O_3$), tin oxide (SnO), silicon oxide ($SiO_2$), tantalum oxide ($Ta_2O_5$), lanthanum oxide ($La_2O_3$), hydrofluoroolefin (HfO), cerium oxide ($CeO_2$), and combinations thereof. The coating layer may be one of a polymeric-type coating layer and a ceramic-type metal oxide coating layer. The ceramic-type metal oxide coating may include at least one of the dopants.

In one aspect, the coating layer may have a thickness ranging from about 1 nm to about 50 nm.

In one aspect, the polymeric-type coating layer may include one of an aluminum oxide composite (alucone) film, a zirconium alkoxide composite (zircone) film, a titanium alkoxide composite (titanicone) film, and a polyimide film.

In one aspect, the polymeric-type coating layer may include an aluminum oxide composite (alucone) film comprising a precursor material selected from the group consisting of: trimethylaluminum (TMA), ethylene glycol (EG), terephthaloyl chloride (TC), glycidol (GLY), hydroquinone (HQ), and combinations thereof.

In one aspect, the electrolyte system may be one of an ether-based electrolyte system and a carbonate-based electrolyte system.

In one aspect, wherein the modified separator may have a melting point ranging from about 120° C. to about 200° C., and the precursor material for the aluminum oxide composite (alucone) film of the polymeric-type coating layer may include a combination of trimethylaluminum (TMA) and ethylene glycol (EG).

In one aspect, the polymeric-type coating may be a molecular layer deposition (MLD) coating layer.

In one aspect, the ceramic-type metal oxide coating layer may include a ceramic material selected from the group consisting of: aluminum oxide ($Al_2O_3$), titanium dioxide ($TiO_2$), zirconium dioxide ($ZrO_2$), zinc oxide (ZnO), silicon oxide ($SiO_2$), and combinations thereof.

In one aspect, the ceramic-type metal oxide coating may be an atomic layer deposition (ALD) coating layer.

In one aspect, the substrate may include an amount of dopant ranging from about 1 $g/m^2$ to about 10 $g/m^2$.

In one aspect, the substrate may include a polyolefin.

In one aspect, the electrolyte system may include a lithium salt selected from the group consisting of: lithium hexafluorophosphate ($LiPF_6$), lithium bis(fluorosulfonyl)imide ($LiN(FSO_2)_2$) (LiSFI), lithium bis(oxalato)borate ($LiB(C_2O_4)_2$) (LiBOB), lithium difluorooxalatoborate ($LiBF_2(C_2O_4)$), lithium perchlorate ($LiClO_4$), lithium tetrachloroaluminate ($LiAlCl_4$), lithium iodide (LiI), lithium bromide (LiBr), lithium thiocyanate (LiSCN), lithium tetrafluoroborate ($LiBF_4$), lithium tetraphenylborate (LiB ($C_6H_5$)$_4$), lithium hexafluoroarsenate (LiAsF$_6$), lithium trifluoromethanesulfonate (LiCF$_3$SO$_3$), bis(trifluoromethane) sulfonimide lithium salt (LiN(CF$_3$SO$_2$)$_2$), and combinations; and a solvent selected from the group consisting of: ethylene carbonate (EC), propylene carbonate (PC), butylene carbonate (BC), fluoroethylene carbonate (FEC), dimethyl carbonate (DMC), diethyl carbonate (DEC), ethylmethylcarbonate (EMC), methyl formate, methyl acetate, methyl propionate, γ-butyrolactone, γ-valerolactone, 1,2-dimethoxyethane, 1,2-diethoxyethane, ethoxymethoxyethane, tetrahydrofuran, 2-methyltetrahydrofuran, 1,3-dioxolane, and combinations thereof.

In various aspects, the present disclosure provides a high-energy lithium metal based electrochemical cell including a polymeric separator and an electrode including a lithium metal-based electroactive material and having surfaces substantially free of dendrite formations. The polymeric separator may include a substrate comprising a dopant and a coating layer disposed on the doped substrate. The dopant and compound comprising the coating layer may each be independently selected from the group consisting of: aluminum oxide (Al$_2$O$_3$), titanium dioxide (TiO$_2$), zirconium dioxide (ZrO$_2$), zinc oxide (ZnO), iron oxide (Fe$_2$O$_3$), tin oxide (SnO), silicon oxide (SiO$_2$), tantalum oxide (Ta$_2$O$_5$), lanthanum oxide (La$_2$O$_3$), hydrofluoroolefin (HfO), cerium oxide (CeO$_2$), and combinations thereof. The coating layer may have a thickness ranging from about 1 nm to about 10 nm.

In one aspect, the high-energy lithium metal based electrochemical cell may further include an electrolyte system having a viscosity ranging from about 50 mPa·s to about 500 mPa·s. The electrolyte system may include a lithium salt dissolved in an organic solvent, where the lithium salt has a concentration in the electrolyte system ranging from about 2 M to about 5 M.

In one aspect, the substrate may include a polyolefin selected from the group consisting of: polyethylene (PE), polypropylene (PP), and combinations thereof.

In one aspect, the substrate may include from about 2 g/m$^2$ to about 5 g/m$^2$ of the dopant.

In yet other aspects, the present disclosure provides a method of making a coated separator. The method may include disposing one of a polymeric-type coating layer and a ceramic-type metal oxide coating layer onto a doped separator having a sheet form. The doped separator may include a dopant selected from the group consisting of: aluminum oxide (Al$_2$O$_3$); titanium dioxide (TiO$_2$); zirconium dioxide (ZrO$_2$); zinc oxide (ZnO); iron oxide (Fe$_2$O$_3$); tin oxide (SnO); silicon oxide (SiO$_2$); tantalum oxide (Ta$_2$O$_5$); lanthanum oxide (La$_2$O$_3$); hydrofluoroolefin (HfO); cerium oxide (CeO$_2$); and combinations thereof.

In one aspect, the coating layer may have a thickness ranging from about 1 nm to about 50 nm, and the coated separator may further include an electrolyte system having a viscosity ranging from about 50 mPa·s to about 500 mPa·s.

In one aspect, the ceramic-type metal oxide coating layer may include a ceramic material selected from the group consisting of: aluminum oxide (Al$_2$O$_3$); titanium dioxide (TiO$_2$); zirconium dioxide (ZrO$_2$); zinc oxide (ZnO); silicon oxide (SiO$_2$); and combinations thereof and may be disposed onto the doped separator using atomic layer deposition (ALD).

In one aspect, the polymeric-type coating layer may include one of an aluminum oxide composite (alucone) film, a zirconium alkoxide composite (zircone) film, a titanium alkoxide composite (titanicone) film, and a polyimide film and may be disposed onto the doped separator using molecular layer deposition (MLD).

In one aspect, the polymeric-type coating layer may be an alucone film and precursor material is selected from the group consisting of: trimethylaluminum (TMA), ethylene glycol (EG), terephthaloyl chloride (TC), glycidol (GLY), hydroquinone (HQ), and combinations thereof.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%. In addition, disclosure of ranges includes disclosure of all values and further divided ranges within the entire range, including endpoints and sub-ranges given for the ranges.

The present disclosure contemplates a modified separator for a high-energy lithium metal-based electrochemical cell and methods of formation relating thereto are provided. The modified separator comprises a doped substrate and a coating layer disposed thereon. In various instances, the substrate comprises a dopant selected from the group consisting of: aluminum oxide ($Al_2O_3$), titanium dioxide ($TiO_2$), zirconium dioxide ($ZrO_2$), zinc oxide (ZnO), iron oxide ($Fe_2O_3$), tin oxide (SnO), silicon oxide ($SiO_2$), tantalum oxide ($Ta_2O_5$), lanthanum oxide ($La_2O_3$), hydrofluoroolefin (HfO), cerium oxide ($CeO_2$), and combinations thereof. The coating layer may be one of a polymeric-type coating and a ceramic-type metal oxide coating. The polymeric-type coating layer may be a molecular layer deposition (MLD) coating layer comprising one of an aluminum oxide composite (alucone) film, a zirconium alkoxide composite (zircone) film, a titanium alkoxide composite (titanicone) film, and a polyimide film. The ceramic-type metal oxide coating may be an atomic layer deposition (ALD) coating layer comprising a ceramic material selected from the group consisting of: aluminum oxide ($Al_2O_3$), titanium dioxide ($TiO_2$), zirconium dioxide ($ZrO_2$), zinc oxide (ZnO), silicon oxide ($SiO_2$), and combinations thereof. In various instances, the coating layer may have a thickness ranging from about 1 nm to about 50 nm, optionally from about 1 nm to about 10 nm, and in certain aspects, optionally from about 2 nm to about 10 nm. The modified separator may include an electrolyte having a viscosity ranging from about 50 mPa·s to about 500 mPa·s. The modified separator may have a wettability towards the electrolyte demonstrated by a comparatively low contact angle. The contact angle may range from about 10 degrees to about 40 degrees.

Figure 1:
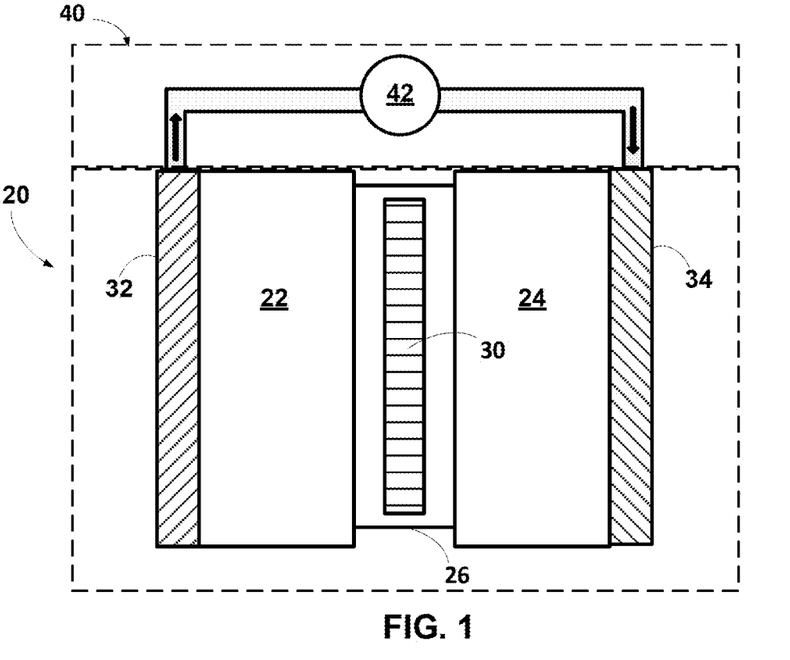
FIG. 1 is a schematic of an exemplary electrochemical battery for purposes of illustration.

An exemplary and schematic illustration of a battery 20 that cycles lithium ions is shown in FIG. 1. The battery 20 may be a lithium ion electrochemical cell, a lithium sulfur electrochemical cell, or a lithium selenium battery, each including a negative electrode 22, a positive electrode 24, and a porous separator 26 disposed between the two electrodes 22, 24. The porous separator 26 includes an electrolyte system 30, which may also be present in the negative electrode 22 and positive electrode 24. A negative electrode current collector 32 may be positioned at or near the negative electrode 22 and a positive electrode current collector 34 may be positioned at or near the positive electrode 24. The negative electrode current collector 32 and positive electrode current collector 34 respectively collect and move free electrons to and from an external circuit 40. An interruptible external circuit 40 and load device 42 connects the negative electrode 22 (through its current collector 32) and the positive electrode 24 (through its current collector 34).

The porous separator 26 operates as both an electrical insulator and a mechanical support, by being sandwiched between the negative electrode 22 and the positive electrode 24 to prevent physical contact and thus, the occurrence of a short circuit. The porous separator 26, in addition to providing a physical barrier between the two electrodes 22, 24, can provide a minimal resistance path for internal passage of lithium ions (and related anions) during cycling of the lithium ions to facilitate functioning of the battery 20. In lithium ion batteries, lithium intercalates and/or alloys in the electrode active materials. However, in a lithium sulfur battery or a lithium selenium battery, instead of intercalating or alloying, the lithium dissolves from the negative electrode and migrates to the positive electrode where it reacts/plates during discharge, while during charging, lithium plates on the negative electrode.

The battery 20 can be charged or re-energized at any time by connecting an external power source to the battery 20 to reverse the electrochemical reactions that occur during battery discharge. The connection of an external power source to the battery 20 compels the production of electrons and release of lithium ions from the positive electrode 24. The electrons, which flow back towards the negative electrode 22 through the external circuit 40, and the lithium ions, which are carried by the electrolyte system 30 across the separator 26 back towards the negative electrode 22, reunite at the negative electrode 22 and replenish it with lithium for consumption during the next battery discharge cycle. As such, each discharge and charge event is considered to be a cycle, where lithium ions are cycled between the positive electrode 24 and negative electrode 22.

The external power source that may be used to charge the battery 20 may vary depending on the size, construction, and particular end-use of the battery 20. Some notable and exemplary external power sources include, but are not limited to, an AC wall outlet and a motor vehicle alternator. In many lithium-ion battery configurations, lithium sulfur and lithium selenium battery configurations, each of the negative current collector 32, negative electrode 22, the separator 26, positive electrode 24, and positive electrode current collector 34 are prepared as relatively thin layers (for example, from several microns to a millimeter or less in thickness) and assembled in layers connected in electrical parallel arrangement to provide a suitable electrical energy and power package.

Furthermore, the battery 20 can include a variety of other components that while not depicted here are nonetheless known to those of skill in the art. For instance, the battery 20 may include a casing, gaskets, terminal caps, tabs, battery terminals, and any other conventional components or materials that may be situated within the battery 20, including between or around the negative electrode 22, the positive electrode 24, and/or the separator 26. As noted above, the size and shape of the battery 20 may vary depending on the particular application for which it is designed. Battery-powered vehicles and hand-held consumer electronic devices, for example, are two examples where the battery 20 would most likely be designed to different size, capacity, and power-output specifications. The battery 20 may also be connected in series or parallel with other similar lithium-ion cells or batteries to produce a greater voltage output, energy, and power if it is required by the load device 42.

Accordingly, the battery 20 can generate electric current to a load device 42 that can be operatively connected to the external circuit 40. While the load device 42 may be any number of known electrically-powered devices, a few specific examples of power-consuming load devices include an electric motor for a hybrid vehicle or an all-electric vehicle, a laptop computer, a tablet computer, a cellular phone, and cordless power tools or appliances. The load device 42 may also be a power-generating apparatus that charges the battery 20 for purposes of storing energy. In certain other variations, the electrochemical cell may be a supercapacitor, such as a lithium-ion based supercapacitor.

With renewed reference to FIG. 1, the positive electrode 24, the negative electrode 22, and the separator 26 may each include an electrolyte solution or system 30, capable of conducting lithium ions between the negative electrode 22 and the positive electrode 24. The electrolyte system 30 may have a viscosity ranging from about 50 mPa·s to about 500 mPa·s. In certain aspects, the electrolyte 30 may be a non-aqueous liquid electrolyte solution that includes one or more lithium salts dissolved in an organic solvent or a mixture of organic solvents. In certain variations, the electrolyte 30 may be a 1M solution of one or more lithium salts in one or more organic solvents. Numerous conventional non-aqueous liquid electrolyte solutions may be employed in the lithium-ion battery 20.

A non-limiting list of lithium salts that may be dissolved in an organic solvent to form the non-aqueous liquid electrolyte solution include lithium hexafluorophosphate ($LiPF_6$), lithium perchlorate ($LiClO_4$), lithium tetrachloroaluminate ($LiAlCl_4$), lithium iodide (LiI), lithium bromide (LiBr), lithium thiocyanate (LiSCN), lithium tetrafluoroborate ($LiBF_4$), lithium tetraphenylborate ($LiB(C_6H_5)_4$), lithium bis(oxalato)borate ($LiB(C_2O_4)_2$) (LiBOB), lithium difluorooxalatoborate ($LiBF_2(C_2O_4)$), lithium hexafluoroarsenate ($LiAsF_6$), lithium trifluoromethanesulfonate ($LiCF_3SO_3$), lithium trigluoromethanesulfonimide ($LiN(CF_3SO_2)_2$), lithium bis(fluorosulfonyl)imide ($LiN(FSO_2)_2$) (LiSFI), and combinations thereof.

These and other similar lithium salts may be dissolved in a variety of organic solvents, including but not limited to, various alkyl carbonates, such as cyclic carbonates (e.g., ethylene carbonate (EC), propylene carbonate (PC), butylene carbonate (BC), fluoroethylene carbonate (FEC)), linear carbonates (e.g., dimethyl carbonate (DMC), diethyl carbonate (DEC), ethylmethylcarbonate (EMC)), aliphatic carboxylic esters (e.g., methyl formate, methyl acetate, methyl propionate), γ-lactones (e.g., γ-butyrolactone, γ-valerolactone), chain structure ethers (e.g., 1,2-dimethoxyethane, 1-2-diethoxyethane, ethoxymethoxyethane), cyclic ethers (e.g., tetrahydrofuran, 2-methyltetrahydrofuran), 1,3-dioxolane, and combinations thereof.

In various aspects, the positive electrode 24 may be formed from a lithium-based active material that can sufficiently undergo lithium intercalation and deintercalation, alloying and dealloying, or plating and stripping, while functioning as the positive terminal of the battery 20. The positive electrode 24 electroactive materials may include one or more transition metals, such as manganese (Mn), nickel (Ni), cobalt (Co), chromium (Cr), iron (Fe), vanadium (V), and combinations thereof. Two exemplary common classes of known electroactive materials that can be used to form the positive electrode 24 are lithium transition metal oxides with layered structure and lithium transition metal oxides with spinel phase.

For example, in certain instances, the positive electrode 24 may include a spinel-type transition metal oxide, like lithium manganese oxide ($Li_{(i+x)}Mn_{(2-x)}O_4$), where x is typically less than 0.15, including $LiMn_2O_4$ (LMO) and lithium manganese nickel oxide $LiMn_{1.5}Ni_{0.5}O_4$ (LMNO).

In other instances, the positive electrode 24 may include layered materials like lithium cobalt oxide (LiCoO$_2$), lithium nickel oxide (LiNiO$_2$), a lithium nickel manganese cobalt oxide (Li(Ni$_x$Mn$_y$Co$_z$)O$_2$), where 0≤x≤1, 0≤y≤1, 0≤z≤1, and x+y+z=1, including LiMn$_{0.33}$Ni$_{0.33}$Co$_{0.33}$O$_2$, a lithium nickel cobalt metal oxide (LiNi$_{(1-x-y)}$Co$_x$M$_y$O$_2$), where 0<x<1, 0<y<1 and M may be Al, Mn, or the like. Other known lithium-transition metal compounds such as lithium iron phosphate (LiFePO$_4$) or lithium iron fluorophosphate (Li$_2$FePO$_4$F) can also be used. In certain aspects, the positive electrode 24 may include an electroactive material that includes manganese, such as lithium manganese oxide (Li$_{(1+x)}$Mn$_{(2-x)}$O$_4$), a mixed lithium manganese nickel oxide (LiMn$_{(2-x)}$Ni$_x$O$_4$), where 0≤x≤1, and/or a lithium manganese nickel cobalt oxide (e.g., LiMn$_{1/3}$Ni$_{1/3}$Co$_{1/3}$O$_2$). In a lithium-sulfur battery, positive electrodes may have elemental sulfur as the active material or a sulfur-containing active material.

In certain variations, the positive active materials may be intermingled with an optional electrically conductive material and at least one polymeric binder material to structurally fortify the lithium-based active material along with an optional electrically conductive particle distributed therein. For example, the active materials and optional conductive materials may be a slurry cast with such binders, like polyvinylidene difluoride (PVdF), polytetrafluoroethylene (PTFE), ethylene propylene diene monomer (EPDM) rubber, or carboxymethyl cellulose (CMC), a nitrile butadiene rubber (NBR), lithium polyacrylate (LiPAA), sodium polyacrylate (NaPAA), sodium alginate, lithium alginate. Electrically conductive materials may include graphite, carbon-based materials, powdered nickel, metal particles, or a conductive polymer. Carbon-based materials may include by way of non-limiting example particles of KETCHEN™ black, DENKA™ black, acetylene black, carbon black, and the like. Examples of a conductive polymer include polyaniline, polythiophene, polyacetylene, polypyrrole, and the like. In certain aspects, mixtures of conductive materials may be used. As noted above, a positive electrode current collector 34 may be positioned at or near the positive electrode 24. The positive current collector 34 may be formed from aluminum (Al) or any other appropriate electrically conductive material known to those of skill in the art.

In various aspects, the negative electrode 22 includes an electroactive material as a lithium host material capable of functioning as a negative terminal of a lithium-ion battery. The negative electrode 22 may thus include the electroactive lithium host material and optionally another electrically conductive material, as well as one or more polymeric binder materials to structurally hold the lithium host material together. The negative electrode 22 may comprise greater than about 50% to less than about 100% of the electroactive material, optionally less than about 30% of an electrically conductive material, and a balance binder.

For example, in certain instances, the negative electrode 22 may include the electroactive material intermingled with a binder material selected from the group consisting of: polyvinylidene difluoride (PVDF), ethylene propylene diene monomer (EPDM) rubber, or carboxymethyl cellulose (CMC), a nitrile butadiene rubber (NBR), styrene-butadiene rubber (SBR), lithium polyacrylate (LiPAA), sodium polyacrylate (NaPAA), sodium alginate, lithium alginate, polyimide, and combinations thereof. Suitable additional electrically conductive materials may include carbon-based material or a conductive polymer. Carbon-based materials may include for example, particles of KETCHEN™ black, DENKA™ black, acetylene black, carbon black, and the like. Examples of a conductive polymer include polyaniline, polythiophene, polyacetylene, polypyrrole, and the like. In certain aspects, mixtures of conductive materials may be used. As noted above, a negative electrode current collector 32 may be positioned at or near the negative electrode 22. The current collector 32 may comprise a metal selected from the group consisting of: copper, nickel, iron, titanium, and combinations thereof. The current collector may be formed of an iron alloy, such as stainless steel, by way of example.

In various aspects, the porous separator 26 may comprise a microporous polymeric separator including a polyolefin. The polyolefin may be a homopolymer (derived from a single monomer constituent) or a heteropolymer (derived from more than one monomer constituent), which may be either linear or branched. If a heteropolymer is derived from two monomer constituents, the polyolefin may assume any copolymer chain arrangement, including those of a block copolymer or a random copolymer. Similarly, if the polyolefin is a heteropolymer derived from more than two monomer constituents, it may likewise be a block copolymer or a random copolymer. In certain aspects, the polyolefin may be polyethylene (PE), polypropylene (PP), or a blend of polyethylene (PE) and polypropylene (PP), or multi-layered structured porous films of polyethylene (PE) and/or polypropylene (PP).

When the porous separator 26 is a microporous polymeric separator, it may be a single layer or a multi-layer laminate, which may be fabricated from either a dry or wet process. For example, in one embodiment, a single layer of the polyolefin may form the entire microporous polymer separator 26. In other aspects, the separator 26 may be a fibrous membrane having an abundance of pores extending between the opposing surfaces and may have a thickness of less than a millimeter, for example. As another example, however, multiple discrete layers of similar or dissimilar polyolefins may be assembled to form the microporous polymer separator 26.

Figure 2:
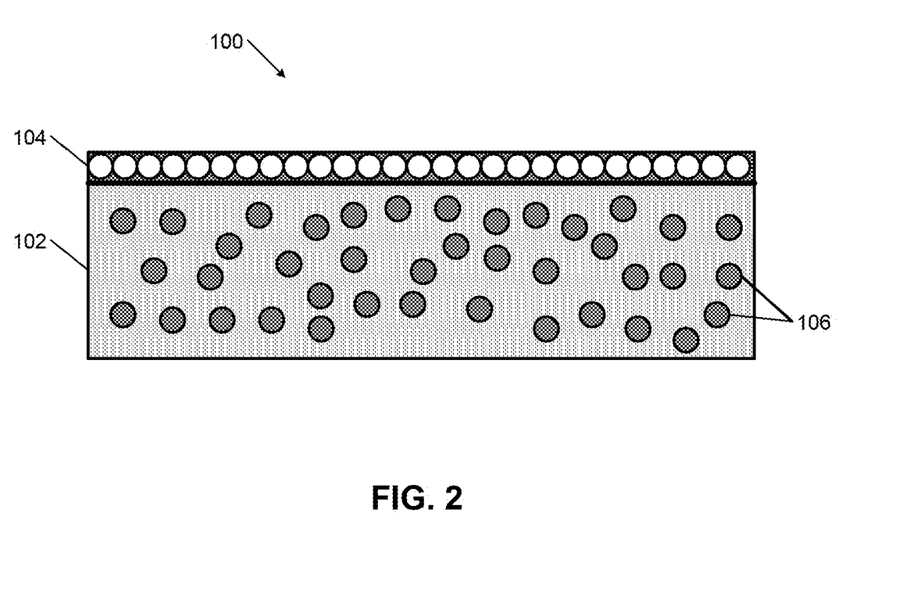
FIG. 2 is a sectional view of an example coated separator formed in accordance with certain aspects of the present disclosure.

In various aspects, as seen in FIG. 2, the separator 100 comprises a doped substrate 102 and a coating layer 104 disposed thereon. In various instances, the substrate 102 comprises a dopant 106 selected from the group consisting of: aluminum oxide (Al$_2$O$_3$), titanium dioxide (TiO$_2$), zirconium dioxide (ZrO$_2$), zinc oxide (ZnO), iron oxide (Fe$_2$O$_3$), tin oxide (SnO), silicon oxide (SiO$_2$), tantalum oxide (Ta$_2$O$_5$), lanthanum oxide (La$_2$O$_3$), hydrofluoroolefin (HfO), cerium oxide (CeO$_2$), and combinations thereof. The doped substrate 102 may include a dopant amount ranging from about 1 g/m$^2$ to about 10 g/m$^2$, optionally from about 2 g/m$^2$ to about 5 g/m$^2$, and in certain aspects, optionally from about 4 g/m$^2$ to about 5 g/m$^2$. The doped substrate 102 may have a porosity ranging from about 30 gurley seconds to about 40 gurley seconds, and in certain aspects, optionally 31 gurley seconds. The doped substrate 102 may have a thickness ranging from about 15 μm to about 20 μm.

In various instances, the coating layer 104 may be one of a polymeric-type coating layer and a ceramic-type metal oxide coating layer. The ceramic-type metal oxide coating layer comprises a ceramic material selected from the group consisting of: aluminum oxide (Al$_2$O$_3$), titanium dioxide (TiO$_2$), zirconium dioxide (ZrO$_2$), zinc oxide (ZnO), silicon oxide (SiO$_2$), and combinations thereof. The ceramic-type metal oxide coating layer may be disposed onto the doped separator using atomic layer deposition (ALD). The polymeric-type coating layer comprises one of an aluminum oxide composite (alucone) film, a zirconium alkoxide composite (zircone) film, a titanium alkoxide composite (titanicone) film, and a polyimide film and may be disposed onto the doped separator using molecular layer deposition (MLD). Thus, in various aspects, the coating layer 104 may comprise a compound selected from the group consisting of: aluminum oxide ($Al_2O_3$), titanium dioxide ($TiO_2$), zirconium dioxide ($ZrO_2$), zinc oxide (ZnO), iron oxide ($Fe_2O_3$), tin oxide (SnO), silicon oxide ($SiO_2$), tantalum oxide ($Ta_2O_5$), lanthanum oxide ($La_2O_3$), hydrofluoroolefin (HfO), cerium oxide ($CeO_2$), and combinations thereof. The coating layer may have a thickness ranging from about 1 nm to about 50 nm, optionally from about 1 nm to about 10 nm, and in certain aspects, optionally from about 2 nm to about 10 nm.

Figure 3:
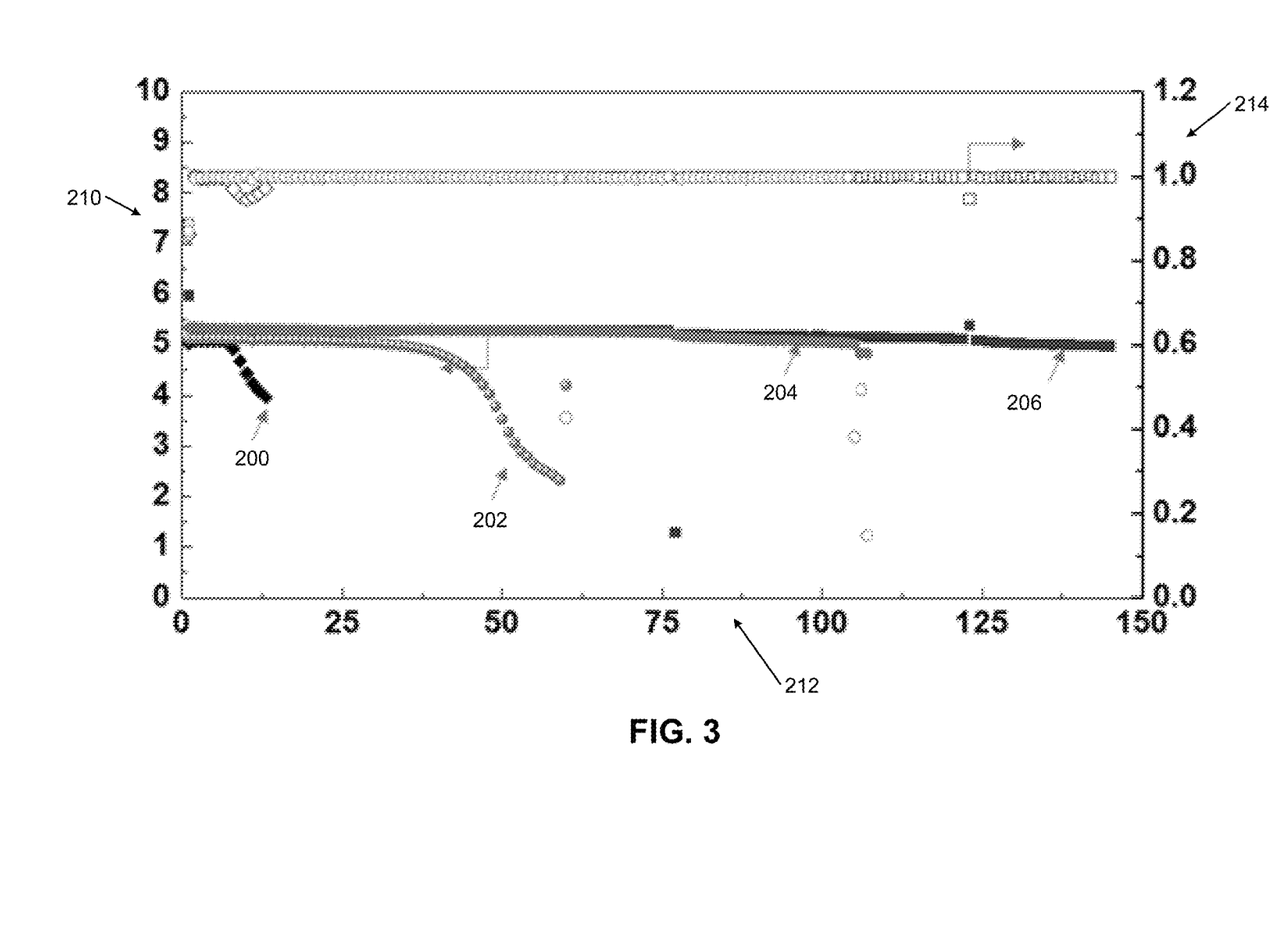
FIG. 3 is a graphical illustration of the capacity retention per cycle of comparative electrochemical cells each comprising an electrolyte system having a viscosity ranging from about 50 mPa·s to about 500 mPa·s and a polypropylene-based separator.

In certain aspects, the modified separator 100 comprising a doped substrate 102 and the coating layer 104 disposed thereon has improved wettability towards the comparatively high viscous electrolyte (e.g., electrolyte system 30), while simultaneously blocking dendrite formation. Thus, improving long-term performance of the electrochemical cell (e.g., battery 20), such as a lithium metal-based battery, including the modified separator. For example, FIG. 3 shows the charging and discharging profiles of comparative electrochemical cells 200, 202, 204, and 206 each including an electrolyte system having a viscosity ranging from about 50 mPa·s to about 500 mPa·s and a polypropylene-based separator. The $y_1$-axis 210 depicts the capacity retention in milliamp hour (mAh), while the cycle number is shown on the x-axis 212. The $y_2$-axis 214 depicts efficiency.

Electrochemical cell 200 includes a baseline separator comprising pure polypropylene and an electrolyte system having a viscosity of about 100 mPa·s. Electrochemical cell 202 includes a separator comprising a polypropylene substrate coated with a coating layer comprising $Al_2O_3$ and having an electrolyte system with a viscosity of about 100 mPa·s. Electrochemical cell 204 includes a separator comprising a polypropylene substrate having a $SiO_2$ dopant in an amount ranging from about 2 $g/m^2$ to about 5 $g/m^2$ and having an electrolyte system with a viscosity of about 100 mPa·s. Electrochemical cell 206 includes a separator prepared in accordance with certain aspects of the present disclosure. In particular, electrochemical cell 206 includes the dopant of electrochemical cell 204 and the coating of electrochemical cell 202 and has an electrolyte system with a viscosity of about 100 mPa·s. As seen electrochemical cell 206 has superior long-term performance and stability over electrochemical cells 200, 202, and 204. Accordingly, electrochemical cell 206 prepared in accordance with certain aspects of the present disclosure, has improved cycling performance and reduced capacity fade.

In various aspects, the present disclosure provides a method of forming the coating layer of the modified separator. In various aspects, the method includes disposing one of a polymeric-type coating layer and a ceramic-type coating metal oxide coating layer onto a doped separator. In certain aspects, the polymeric-type coating layer may be disposed using, for example, molecular layer deposition (MLD). The polymeric-type coating layer resulting from molecular layer deposition (MLD) may comprise one of an aluminum oxide composite (alucone) film, a zirconium alkoxide composite (zircone) film, a titanium alkoxide composite (titanicone) film, and a polyimide film. For example, the polymeric-type coating layer may be an aluminum oxide composite (alucone) film resulting from a precursor material selected from the group consisting of: trimethylaluminum (TMA), ethylene glycol (EG), terephthaloyl chloride (TC), glycidol (GLY), hydroquinone (HQ), and combinations thereof.

In certain aspects, the ceramic-type metal oxide coating layer may be disposed using, for example, atomic layer deposition (ALD). The ceramic-type metal oxide coating layer resulting from the atomic layer deposition (ALD) may comprise a ceramic material selected from the group consisting of: aluminum oxide ($Al_2O_3$); titanium dioxide ($TiO_2$); zirconium dioxide ($ZrO_2$); zinc oxide (ZnO); silicon oxide ($SiO_2$); and combinations thereof and is disposed onto the doped separator using atomic layer deposition (ALD).

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A modified separator for an electrochemical cell that cycles lithium ions, the modified separator comprising:
a polymeric separator comprising a doped substrate and a coating layer disposed thereon, wherein
the substrate is doped with a dopant selected from the group consisting of: aluminum oxide ($Al_2O_3$), titanium dioxide ($TiO_2$), zirconium dioxide ($ZrO_2$), zinc oxide (ZnO), iron oxide ($Fe_2O_3$), tin oxide (SnO), silicon oxide ($SiO_2$), tantalum oxide ($Ta_2O_5$), lanthanum oxide ($La_2O_3$), hydrofluoroolefin (HfO), cerium oxide ($CeO_2$), and combinations thereof and the dopant is mixed with one or more polymers of the polymeric separator, and
the coating layer is one of a polymeric-type coating layer and a ceramic-type metal oxide coating layer, wherein the ceramic-type metal oxide coating comprises at least one of the dopants; and
an electrolyte system having a viscosity ranging from about 50 mPa·s to about 500 mPa·s.

2. The modified separator of claim 1, wherein the coating layer has a thickness ranging from about 1 nm to about 50 nm.

3. The modified separator of claim 2, wherein the polymeric-type coating layer comprising one of an aluminum oxide composite (alucone) film, a zirconium alkoxide composite (zircone) film, a titanium alkoxide composite (titanicone) film, and a polyimide film.

4. The modified separator of claim 3, wherein the polymeric-type coating layer is the aluminum oxide composite (alucone) film including a precursor material selected from the group consisting of: trimethylaluminum (TMA), ethylene glycol (EG), terephthaloyl chloride (TC), glycidol (GLY), hydroquinone (HQ), and combinations thereof.

5. The modified separator of claim 4, wherein the modified separator has a melting point ranging from about 120° C. to about 200° C. and the precursor material includes a combination of trimethylaluminum (TMA) and ethylene glycol (EG).

6. The modified separator of claim 4, wherein electrolyte system is one of an ether-based electrolyte system and a carbonate-based electrolyte system.

7. The modified separator of claim 3, wherein the polymeric-type coating is a molecular layer deposition (MLD) coating layer.

8. The modified separator of claim 7, wherein the ceramic-type metal oxide coating layer comprises a ceramic material selected from the group consisting of: aluminum oxide ($Al_2O_3$), titanium dioxide ($TiO_2$), zirconium dioxide ($ZrO_2$), zinc oxide (ZnO), silicon oxide ($SiO_2$), and combinations thereof.

9. The modified separator of claim 8, wherein the ceramic-type metal oxide coating is an atomic layer deposition (ALD) coating layer.

10. The modified separator of claim 1, wherein the substrate comprises an amount of dopant ranging from about 1 $g/m^2$ to about 10 $g/m^2$.

11. The modified separator of claim 10, wherein the substrate comprises a polyolefin.

12. The modified separator of claim 1, wherein the electrolyte system comprises:
  a lithium salt selected from the group consisting of: lithium hexafluorophosphate ($LiPF_6$), lithium bis(fluorosulfonyl)imide ($LiN(FSO_2)_2$) (LiSFI), lithium bis(oxalato)borate ($LiB(C_2O_4)_2$) (LiBOB), lithium difluorooxalatoborate ($LiBF_2(C_2O_4)$), lithium perchlorate ($LiClO_4$), lithium tetrachloroaluminate ($LiAlCl_4$), lithium iodide (LiI), lithium bromide (LiBr), lithium thiocyanate (LiSCN), lithium tetrafluoroborate ($LiBF_4$), lithium tetraphenylborate ($LiB(C_6H_5)_4$), lithium hexafluoroarsenate ($LiAsF_6$), lithium trifluoromethanesulfonate ($LiCF_3SO_3$), bis(trifluoromethane) sulfonimide lithium salt ($LiN(CF_3SO_2)_2$), and combinations; and
  a solvent selected from the group consisting of: ethylene carbonate (EC), propylene carbonate (PC), butylene carbonate (BC), fluoroethylene carbonate (FEC), dimethyl carbonate (DMC), diethyl carbonate (DEC), ethylmethylcarbonate (EMC), methyl formate, methyl acetate, methyl propionate, γ-butyrolactone, γ-valerolactone, 1,2-dimethoxyethane, 1,2-diethoxyethane, ethoxymethoxyethane, tetrahydrofuran, 2-methyltetrahydrofuran, 1,3-dioxolane, and combinations thereof.

13. A high-energy lithium metal based electrochemical cell comprising:
  a polymeric separator comprising a substrate including a dopant and a polymeric-type coating layer disposed on the doped substrate,
  wherein the dopant is selected from the group consisting of: aluminum oxide ($Al_2O_3$), titanium dioxide ($TiO_2$), zirconium dioxide ($ZrO_2$), zinc oxide (ZnO), iron oxide ($Fe_2O_3$), tin oxide (SnO), silicon oxide ($SiO_2$), tantalum oxide ($Ta_2O_5$), lanthanum oxide ($La_2O_3$), hydrofluoroolefin (HfO), cerium oxide ($CeO_2$), and combinations thereof,
  the polymeric-type coating layer is an aluminum oxide composite (alucone) film including a precursor material comprising trimethylaluminum (TMA) and ethylene glycol (EG),
  the polymeric-type coating layer has a thickness ranging from about 1 nm to about 50 nm,
  the polymeric separator has a melting point ranging from about 120° C. to about 200° C., and
  an electrode comprising a lithium metal-based electroactive material and having surfaces substantially free of dendrite formations.

14. The electrochemical cell of claim 13, further comprising:
  an electrolyte system having a viscosity ranging from about 50 mPa·s to about 500 mPa·s and comprising a lithium salt dissolved in an organic solvent, wherein the lithium salt has a concentration in the electrolyte system ranging from about 2 M to about 5 M.

15. The electrochemical cell of claim 13, wherein the substrate comprises a polyolefin selected from the group consisting of: polyethylene (PE), polypropylene (PP), and combinations thereof, and
  wherein the substrate includes from about 2 $g/m^2$ to about 5 $g/m^2$ of the dopant.

16. A method of making a coated separator, the method comprising:
  disposing one of a polymeric-type coating layer and a ceramic-type metal oxide coating layer onto a doped polymeric separator having a sheet form, wherein the doped separator comprises a dopant selected from the group consisting of: aluminum oxide ($Al_2O_3$); titanium dioxide ($TiO_2$); zirconium dioxide ($ZrO_2$); zinc oxide (ZnO); iron oxide ($Fe_2O_3$); tin oxide (SnO); silicon oxide ($SiO_2$); tantalum oxide ($Ta_2O_5$); lanthanum oxide ($La_2O_3$); hydrofluoroolefin (HfO); cerium oxide ($CeO_2$); and combinations thereof, the dopant is mixed with one or more polymers of the polymeric separator, and the ceramic-type metal oxide coating comprises at least one dopant.

17. The method of claim 16, wherein the coating layer has a thickness ranging from about 1 nm to about 50 nm, and
  the coated separator further includes an electrolyte system having a viscosity ranging from about 50 mPa·s to about 500 mPa·s.

18. The method of claim 17, wherein the ceramic-type metal oxide coating layer comprises a ceramic material selected from the group consisting of: aluminum oxide ($Al_2O_3$); titanium dioxide ($TiO_2$); zirconium dioxide ($ZrO_2$); zinc oxide (ZnO); silicon oxide ($SiO_2$); and combinations thereof and is disposed onto the doped separator using atomic layer deposition (ALD).

19. The method of claim 17, wherein the polymeric-type coating layer comprises one of an aluminum oxide composite (alucone) film, a zirconium alkoxide composite (zircone) film, a titanium alkoxide composite (titanicone) film, and a polyimide film and is disposed onto the doped separator using molecular layer deposition (MLD).

20. The method of claim 19, wherein the polymeric-type coating layer is an alucone film and precursor material is selected from the group consisting of: trimethylaluminum (TMA), ethylene glycol (EG), terephthaloyl chloride (TC), glycidol (GLY), hydroquinone (HQ), and combinations thereof.

* * * * *